United States Patent [19]

Makino

[11] 3,895,302

[45] July 15, 1975

[54] CHANNEL SELECTION DEVICE FOR A MULTI-CHANNEL RECEIVER

[75] Inventor: Shinichi Makino, Fujisawa, Japan

[73] Assignee: Tokyo Shibaura Electric Co. Ltd., Kawasaki, Japan

[22] Filed: Mar. 21, 1973

[21] Appl. No.: 343,531

[30] Foreign Application Priority Data

Mar. 25, 1972 Japan .............................. 47-29384

[52] U.S. Cl. .................... 325/464; 325/464; 334/15

[51] Int. Cl. .............................................. H04b 1/16

[58] Field of Search ........... 325/452, 464, 465, 468, 325/453; 334/15, 18; 328/37, 44, 49; 307/221 R, 224, 223

[56] References Cited

UNITED STATES PATENTS

| | | | |
|---|---|---|---|
| 3,178,586 | 4/1965 | Rosenfeld | 328/37 X |
| 3,201,699 | 8/1965 | Maring | 328/49 X |
| 3,518,586 | 6/1970 | Nilssen et al. | 325/465 |
| 3,699,359 | 10/1972 | Shelby | 334/15 X |

*Primary Examiner*—Benedict V. Safourek
*Attorney, Agent, or Firm*—Flynn & Frishauf

[57] ABSTRACT

A channel selection device for a multi-channel receiver includes a plurality of cascade connected shift register stages, each stage having two outputs, for sequentially shifting a binary coded signal from one stage to another under control of a shift pulse. Channel selection switches, each being coupled with a respective one of the two outputs of each of the shift register stages, are provided for bringing a selected shift register stage to a channel selecting position and a variable capacitance tuner is connected to respective ones of the outputs of each of the shift register stages through respective potentiometers. A simultaneous channel selection protection means is provided for causing only a single stage of the shift register stages to be brought to the channel selecting position when at least two of all of the channels of the devices are simultaneously selected by an erroneous operation.

8 Claims, 21 Drawing Figures

CHANNEL SELECTION DEVICE FOR A MULTI-CHANNEL RECEIVER

This invention relates to a channel selection device for use in a multi-cnannel receiver, such as a television receiver.

Two types of such channel selection devices or tuners are in practical use, one employing a mechanical switch including a single movable contact and a plurality of stationary contacts that are sequentially in change-over contact with the movable contact, the other being a so-called contactless tuner in which the applied voltage of a varactor diode is electronically controlled instead of using such a mechanical switch. The mechanical contact type tuner, however, has the disadvantage that in long use of the tuner, its contacts are caused to be worn away with the resultant insufficient contact. Thus, in recent years, use of such contactless tuner has been encouraged.

A contactless tuner formerly comprised push putton switches of a number at least equal to the predetermined number of channels and which were arranged such that only one of them could be operated in sequence, thereby to switchably control the impressed voltage of a varactor diode included in the tuner. The push button switch assembly, however, had the drawbacks that it not only had a relatively complicated arrangement but also was bulky and that a considerably large amount of depressing force was required for the switching operation. A contactless tuner using such push button assembly was unsuited for practical use with a channel selection device particularly provided with a remote controller.

Quite recently, a channel selection device capable of selecting a channel particularly by a remote controller has been proposed in which a channel selection pulse is successively fed to a binary counter and the impressed voltage of a variable capacitance diode is switchably controlled by the output signal from a decoder coupled with said counter. In the channel selection device of this nature, it is possible to select a channel in a predetermined order or sequence but impossible to effect individual channel selection as with the device of the push-button type. Such a device also has a tendency to cause an indefinite channel to be selected at the time of power supply.

An object of this invention therefore is to provide a channel selection device capable of selecting individual channels which may also be used as a type effecting the selection by a remote controller.

Another object of the invention is to provide a channel selection device in which sequential channel selection is possible.

Still another object of the invention is to provide a channel selection device capable of sequentially selecting the first and any succeeding number of channels.

A further object of the invention is to provide a channel selection device capable of always selecting only one channel under any circumstances including an initial state of power supply.

A still further object of the invention is to provide a channel selection device which may be suitably arranged in the form of an integrated circuit.

SUMMARY OF THE INVENTION

According to the present invention, a channel selection device for a multi-channel receiver comprises a shift register means including a plurality of cascade connected shift register stages for sequentially shifting a binary coded signal from one of the stages to another under control of a shift pulse, each of the stages having two outputs and the number of stages being the same as the number of channels of the multi-channel receiver which are adapted to be selected. Channel selection switches, each coupled with a respective one of the two outputs of each of the shift register stages, are provided for bringing a selected shift register stage to a channel selecting position, and a tuner including a variable capacitance diode is coupled to the respective ones of the two outputs of each of the shift register stages through respective potentiometers, for tuning a selected channel. Further provided is a simultaneous channel selection protecting means coupled to the shift register stages for causing only a single stage of the shift register stages to be brought to the channel selecting position when at least two of all of the channels of the channel selecting device are simultaneously selected by an erroneous operation.

With the device of the arrangement described, it is possible to individually select an optional channel by selectively operating any one of the switches. It is also possible to effect sequential channel selection that can be adapted for remote controlling, by successively impressing a channel selection pulse on the foremost or first one of the cascade arranged shift register units. It is possible, by causing any one of the potentiometers to be short-circuited, to sequentially select the first and any succeeding number of channels up to that which precedes the channel provided with a short circuited potentiometer.

According to a further feature of the invention, a parity generator is provided which, when two channels are simultaneously selected due to some erroneous operation, generates an output till the channel selection signal becomes one that is solely applicable to a single channel, the output from the parity generator keeping the shift register units for all the channels to be in a reset position. The channel selection device incorporating such a parity generator enables only a single channel to be positively selected under all circumstances including an initial state of power supply.

A preferred embodiment of the channel selection device according to this invention will now be described with reference to the accompanying drawings.

Figure 1:
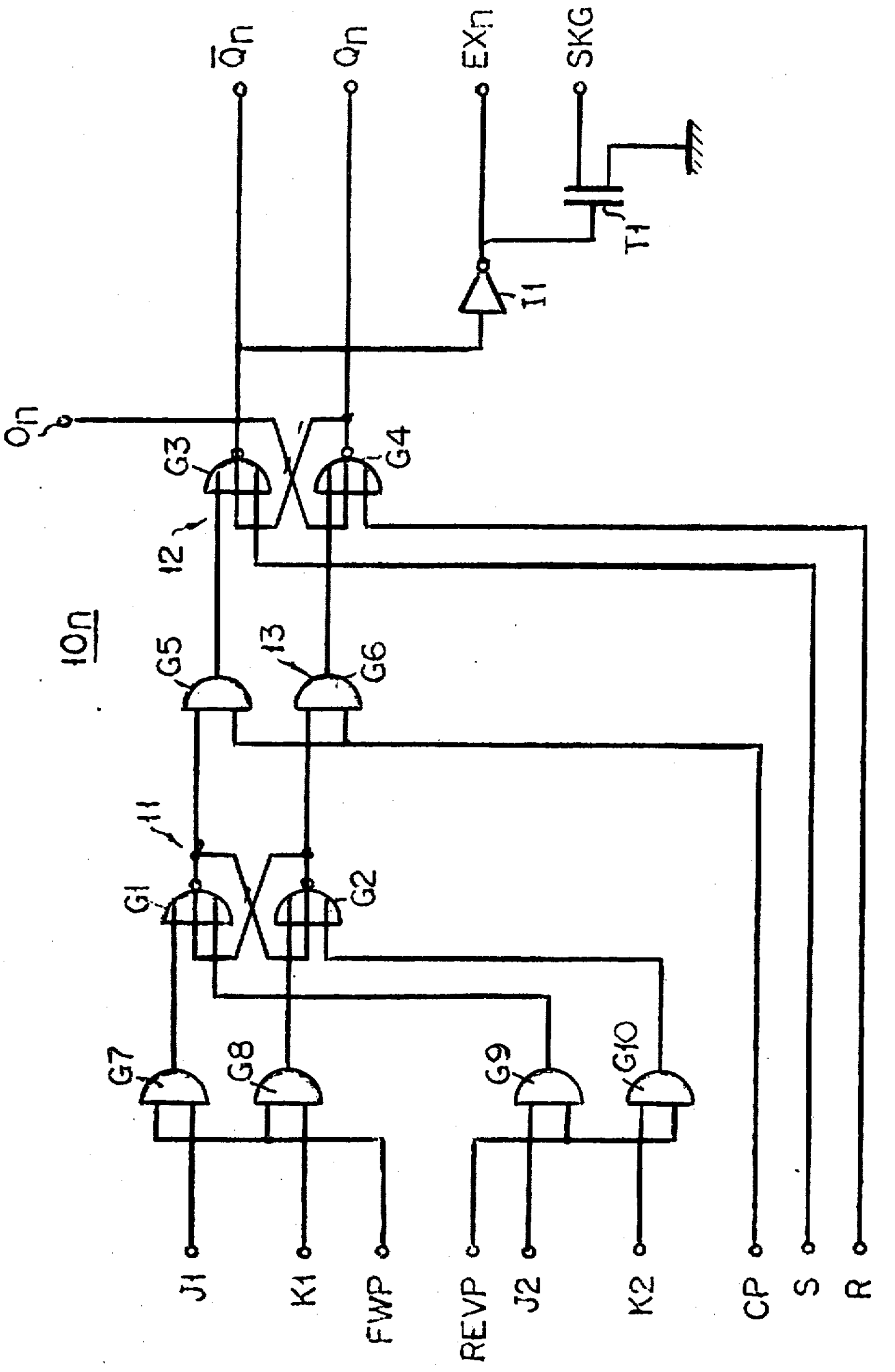
FIG. 1 shows a practical circuit arrangement of a temporary signal storage unit or shift register unit used in the device of this invention.

FIG. 1 illustrates the practical circuit arrangement of a temporary signal storage unit or shift register unit 10$n$ for each channel used in the embodiment of this invention. The shift register unit 10$n$ comprises a front half or master flip flop circuit 11 including two NOR gates G1 and G2 each having its input cross coupled with the output of the other; a rear half or slave flip flop circuit 12 including two NOR gates G3 and G4 of substantially the same construction as those of said circuit 11; and a coupling or switching circuit 13 arranged between said circuits 11 and 12 and formed of two AND gates G5 and G6 each having an input connected to the corresponding NOR gate of the master flip flop circuit 11 and another common input CP impressed with a clock or shift pulse to be described later. The outputs of the AND gates G5 and G6 are connected to the inputs of the corresponding NOR gates G3 and G4 of the slave flip flop circuit 12. To the inputs of the NOR gates G1 and G2 of the master flip flop circuit 11 are connected the corresponding outputs of two AND gates G7 and G8 for forward shifting, the AND gate G7 having two inputs connected respectively to a terminal J1 and a terminal FWP upon which a forward shifting pulse to be described later is impressed and the AND gate G8 having two input connected respectively to a terminal K1 and the terminal FWP. To the inputs of the NOR gates G1 and G2 are further connected the corresponding outputs of two AND gates G9 and G10 for reversely shifting and which have an arrangement similar to that of said AND gates G7 and G8. The AND gates G9 and G10 have a common input REVP upon which a reverse shifting pulse to be described later is impressed in lieu of the forward shifting pulse. The AND gate G9 has another input connected to a terminal J2 and the AND gate G10 has another input connected to a terminal K2.

The master flip flop circuit 11 thus is a so-called J-K type flip flop circuit. The slave flip flop circuit 12, on the other hand, which comprises the NOR gates G3 and G4 having further inputs connected to a set terminal S and a reset terminal R to be described later is a so-called R-S type flip flop circuit.

Either of two outputs Qn and $\overline{Q}$n of the R-S flip flop circuit 12, e.g., $\overline{Q}$n functions not only as a channel-selection signal deriving terminal On, but also as an input terminal EXn of a parity generator 23 (to be described later) through an inverter I1 whose output is connected to the gate of an insulated gate or metal-oxide-semiconductor field effect transistor T1 (hereinafter referred to as "MOSFET" which in this specification is without exception a P channel type.) contained in a skip circuit constituting a NOR gate to be described later. The source of the MOSFET T1 is connected to ground and the drain thereof connected to a skip terminal SKG.

A plurality of shift register units of the arrangement shown in FIG. 1 are successively cascade connected in the manner described below and as outlined in FIG. 2, by the number equivalent to the number $n$ (assume now that $n$=13) of channels required. The two outputs Qn, $\overline{Q}$n of the slave flip flop circuit 12 in each of the cascade arranged shift register stages or units $\mathbf{10}_1$, $\mathbf{10}_2$, $\mathbf{10}_3$, . . . $\mathbf{10}_{12}$ and $\mathbf{10}_{13}$ are connected to the J1 and K1 terminals associated with the master flip flop circuit 11 of the succeeding stage or channel except for the last shift register stage $\mathbf{10}_{13}$, and also to the J2 and K2 terminals associated with the master flip flop circuit 11 of the preceding stage except that no such connection is made at the first shift register stage $\mathbf{10}_1$. The forward shifting pulse impression terminal FWP, the reverse pulse impression terminal REVP and the clock pulse impression terminal CP associated with the master flip flop circuit 11 at each shift register stages $\mathbf{10}_1$ to $\mathbf{10}_{13}$ are respectively connected in common to corresponding terminals FWP, REVP and CP of the shift pulse generator 21 having such a practical circuit arrangement as will be described later. The reset terminals R associated with the slave flip flop circuits 12 of the shift register stages $\mathbf{10}_1$ to $\mathbf{10}_{13}$ are, except first channel CH1, connected in common to a terminal R associated with a set/reset controller 22 having the practical circuit arrangement to be described hereinafter. Further, the reset terminal R of the first channel CH1 is connected to such another terminal $CH_1R$ as is associated with said set/reset controller 22. The terminal EXn of each of the channels CH1 to CH13 is connected to a corresponding input terminal associated with the parity generator 23 of the hereinafter-described practical circuit arrangement. The skip terminals SKG of the channels CH2 to CH12 are connected in common as will be described later more in detail. The skip terminal SKG of the first channel CH1 is connected to the skip terminal of the second channel CH2 via the drain-source path of a gate MOSFET T11, while that of the 13th channel CH13 is similarly connected to the skip terminal of the 12th channel CH12 via the drain-source path of a gate MOSFET T12. The gate of said gate MOSFET T11 is connected to a terminal $\overline{REVP}$ associated with the shift pulse generator 21 and the gate of said gate MOSFET T12 connected to a terminal $\overline{FWP}$ associated therewith. The skip terminal SKG common to the second to 12th channels is connected directly to the J1 terminal associated with the master flip flop circuit 11 of the first channel and also to the J2 terminal associated with the master flip flop circuit in the 13th channel, respectively; and further connected via an inverter I11 to the K1 terminal of the first channel, the K2 terminal of the 13th channel and to a terminal $\overline{SKG}$ associated wtih said set/reset controller 22. The set terminal S associated with the slave flip flop circuit 12 in the first channel is connected to a terminal $CH_1S$ associated with the set/rest controller 22. The output terminal MISS of the parity generator 23 is connected to a terminal MISS associated with the set/reset controller 22. The shift pulse generator 21 includes input terminals FWCOM and REVCOM for receiving a forward shifting command signal and a reverse shifting command signal generated, for example, by an external remote controller (not shown) and generates at the FWP, $\overline{FWP}$, REVP, $\overline{REVP}$ and CP terminals respective signals to be described later. In addition, the shift pulse generator 21 when rendered operative by either of the forward and reverse shifting command signals, generates an output signal from a terminal OP to apply to a terminal OP associated with the set/reset controller 22.

Figure 2:
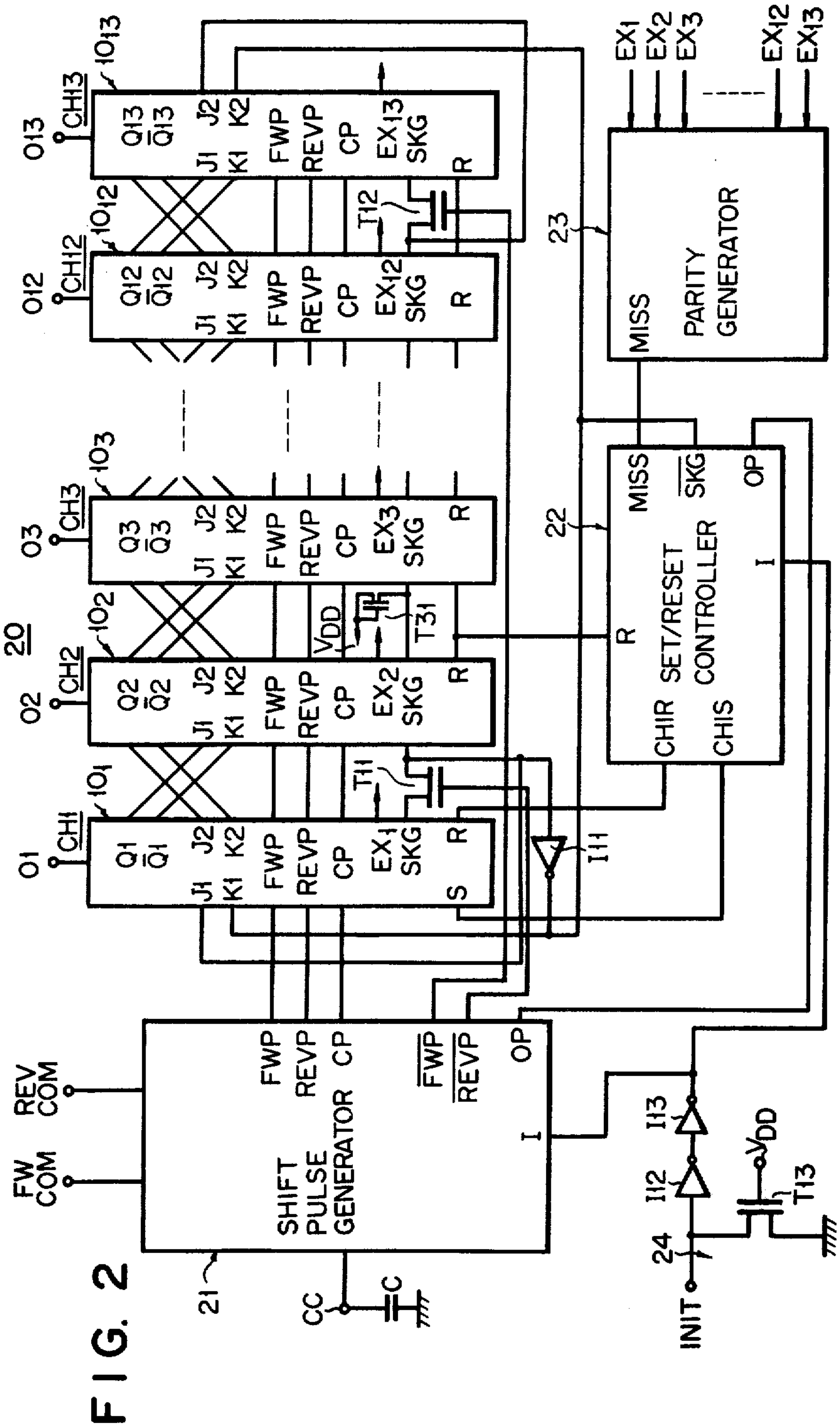
FIG. 2 is a schematic block diagram illustrating the main portion of the device embodying this invention.
Figure 3:
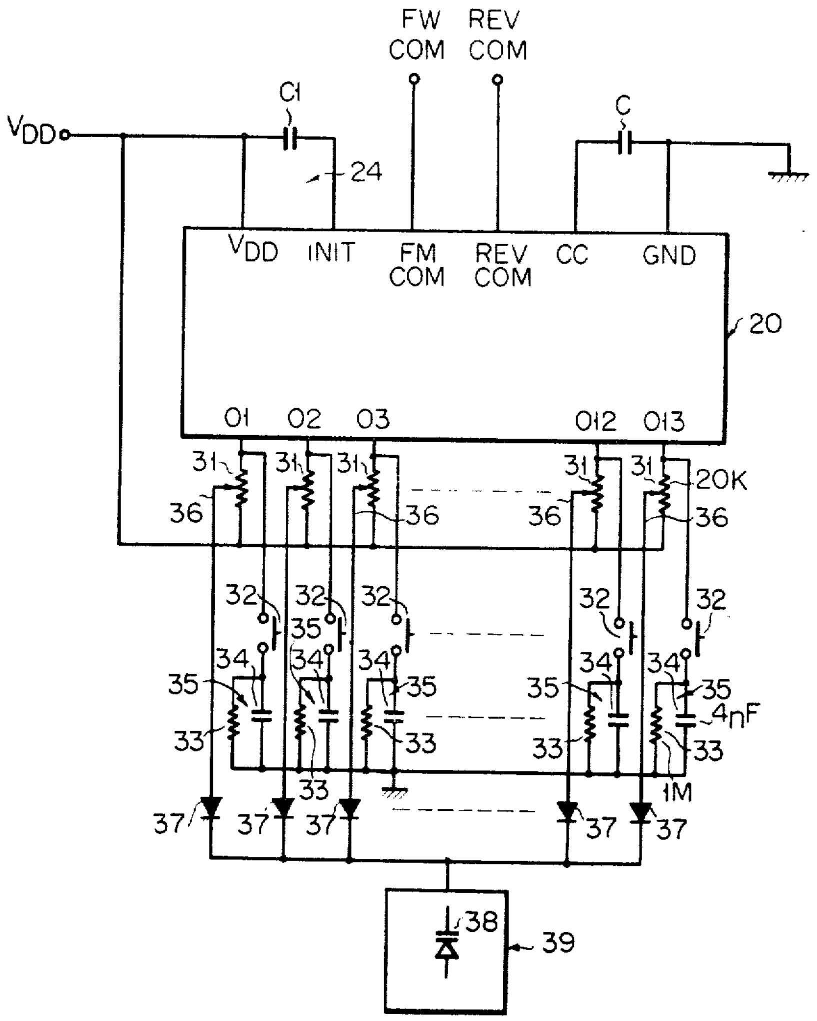
FIG. 3 shows a schematic block diagram illustrating the entire arrangement of the channel selection device embodying this invention.

FIG. 3 shows a circuit diagram showing the entire arrangement of the channel selection device embodying this invention, including the circuitry 20 of FIG. 2. The output terminals $O_1$ to $O_{13}$ of the channels CH1 to CH13 each of which is formed of the aforesaid one output terminal $\overline{Qn}$ of the slave flip flop circuit 12 at each of said cascade arranged shift register stages $\mathbf{10_1}$ to $\mathbf{10_{13}}$ are connected to the nongrounded or negative terminal $V_{DD}(-)$ of a dc power source through corresponding potentiometers 31, and connected further to the reference or grounded positive terminal $V_{DD}(+)$ of the dc power source via corresponding channel selection switches 32 and corresponding parallel circuits 35 each including a resistor 33 and a capacitor 34. Slidable arms 36 of the potentiometers 31 are connected to a tuner 39 including channel-selection varactor diode 38 through corresponding diodes 37 of the polarity indicated. The negative terminal $V_{DD}$ of the dc power source is connected through an initial-state setting capacitor C1 to a terminal INIT which in turn is connected, as shown in FIG. 2, to corresponding terminals I of the shift pulse generator 21 and the set/reset controller 22 via series connected inverters I12 and I13. Said terminal INIT is connected to ground through the drain-source path of a load MOSFET T13 whose gate is connected to the negative terminal $V_{DD}$ of the dc power source.

Figure 4:
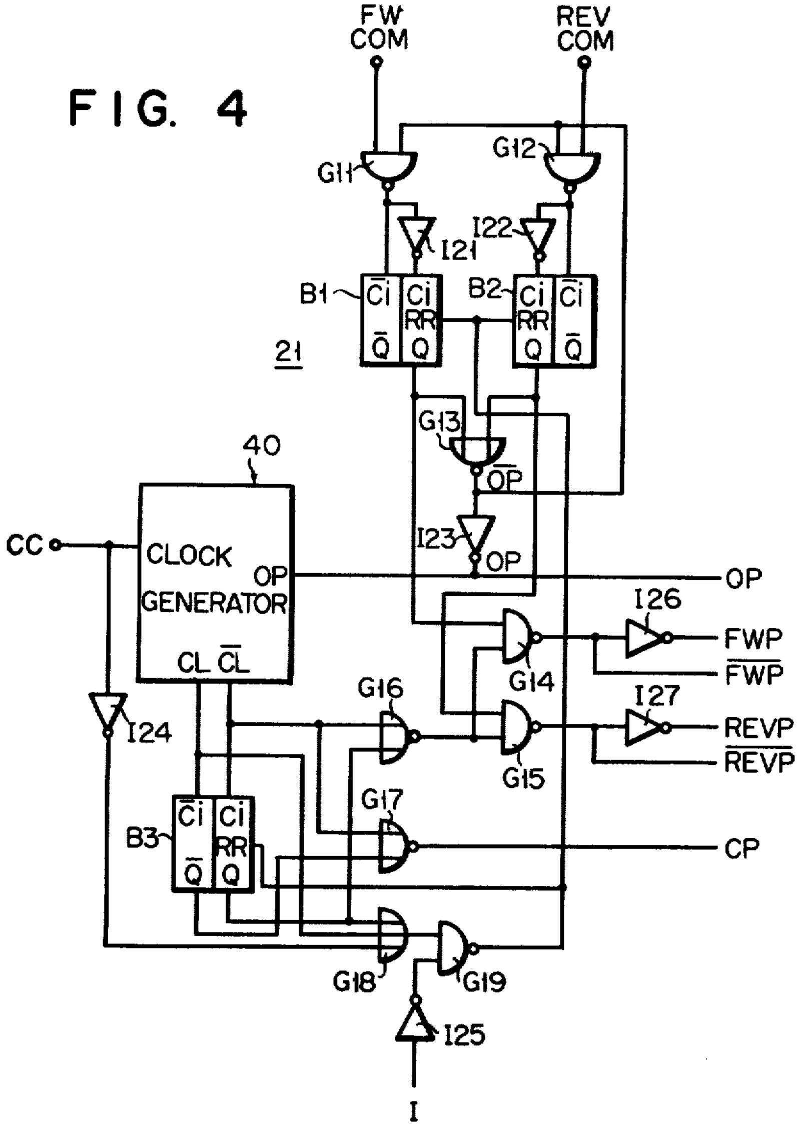
FIG. 4 shows a practical circuit arrangement of a shift pulse generator used in the device according to this invention.

FIG. 4 illustrates a practical circuit arrangement of the shift pulse generator 21. As shown, the shift pulse generator 21 includes two NAND gates G11 and G12, the NAND gate G11 having an input connected to the terminal FWCOM and the NAND gate G12 having an input connected to the terminal REVCOM. The outputs of the NAND gates G11 and G12 are connected to the input terminals of corresponding flip flop or bistable circuits B1 and B2, directly and through corresponding inverters I21 and I22. The Q outputs of said bistable circuits B1 and B2 are connected respectively to a NOR gate G13 as inputs thereto and to corresponding NAND gates G14 and G15. The output OP of said NOR gate G13 is connected in common to the other inputs of the NAND gates G11 and G12, and further connected via an inverter I23 to the OP terminal of a clock pulse generator 40 of the arrangement to be described later as well as to the OP terminal of the set/reset controller 22.

Figure 5:
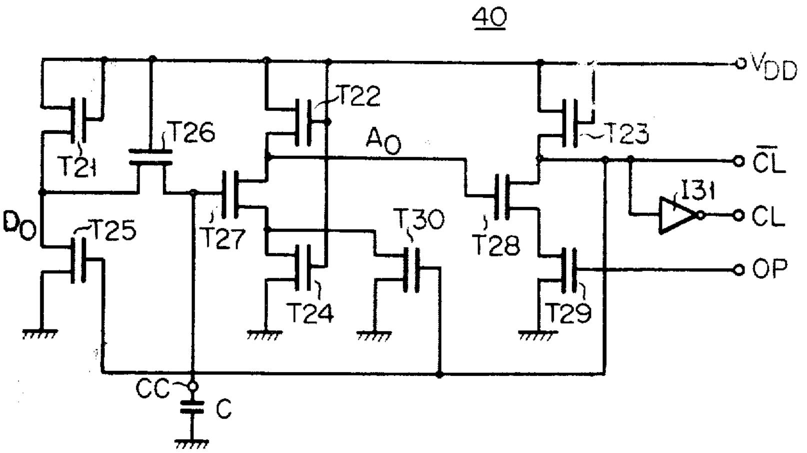
FIG. 5 shows a practical circuit arrangement of the clock pulse generator shown in FIG. 4.

The clock pulse generator 40 of which practical circuit arrangement is shown in FIG. 5 comprises ten MOSFET's of the same channel type, for example, a P-channel type, including four load MOSFET's T21, T22, T23 and T24. The source of the load MOSFET T21 is connected to ground through the drain-source path of a MOSFET T25 and connected to the gate of a MOSFET T27 via the drain-source path of a coupling or switching MOSFET T26, said MOSFET T26 having its gate connected to the negative terminal $V_{DD}$ of the dc power source and the gate of said MOSFET T27 being also connected to one terminal CC of a capacitor C with the other terminal grounded. The MOSFET T27 has its drain connected to the negative terminal $V_{DD}$ of the dc power source via the source-drain path of said load MOSFET T22 and has its source connected to ground via the drain-source path of said load MOSFET T24. Further, the drain of the MOSFET T27 is connected to the gate of a MOSFET T28 whose drain is connected via the source-drain path of said load MOSFET T23 to the negative terminal $V_{DD}$ of the dc power source and whose source is connected to ground via the drain-source path of a MOSFET T29 having its gate connected to the OP terminal. The drain $\overline{CL}$ of the MOSFET T28 is connected to a terminal CL via an inverter I31 and also to the gate of said MOSFET T25 as well as to the gate of a MOSFET T30 whose drain is connected to the source of the MOSFET T27 and whose source is connected to ground. The operation of the clock pulse generator 40 of the arrangement shown in FIG. 5 will now be described. When a negative binary coded signal 1 (or a positive binary coded signal 0) is not impressed on the OP terminal, the condition of all the MOSFET's T21 to T30 remains constant. Thus the operation of the generator 40 will be explained with the assumption that the OP terminal is supplied with a negative binary coded signal (hereinafter referred to as "binary") 1.

Figures 6A, 6B, 6C, 6D, 6E:
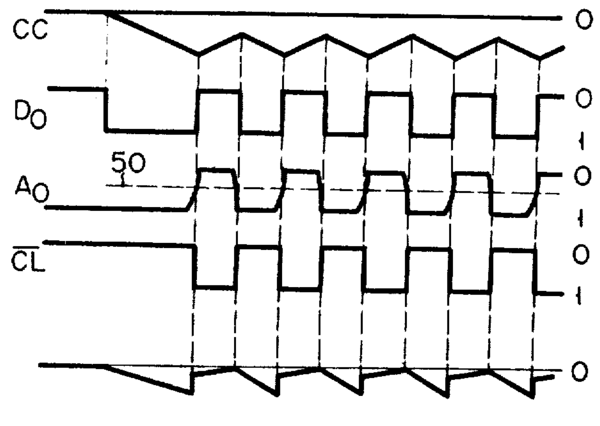
FIGS. 6A to 6E represent the waveforms of circuit portions of the clock pulse generator shown in FIG. 5.

If it is assumed that the charged voltage of the capacitor C is zero the MOSFET T27 is rendered nonconductive with its output $A_0$ of binary 1 as shown in FIG. 6C, and the MOSFET T28 is rendered conductive through the MOSFET T29, with its output $\overline{CL}$ of binary 0 as shown in FIG. 6D, with the result that the terminal CL is in the state of binary 1. As a result, the MOSFET T25 is rendered nonconductive and its output $D_0$ is as shown in FIG. 6B in the state of binary 1. The coupling MOSFET T26 whose gate is connected to the negative source terminal $V_{DD}$ is always rendered conductive. This enables the capacitor C to be charged via the load MOSFET T21 and the coupling MOSFET T26. The gate potential CC of the MOSFET T27, therefore, gradually approaches the value of the negative source voltage $V_{DD}$ as shown in FIG. 6A. As soon as said gate potential reaches the value by which the MOSFET T27 is rendered conductive as shown by a dotted line 50 in FIG. 6C, the MOSFET T28 is rendered nonconductive with its output $\overline{CL}$ of binary 1 and the MOSFET T25 is rendered conductive with its output $D_0$ of binary 0. This makes the MOSFET T30 conductive whereby the MOSFET T27 has its source resistance decreased to increase its gain, with the result that the output potentials of the MOSFET's T27 and T25 more approach the ground potential, in which instance the output potential of the MOSFET T28 further approaches the value of the negative source voltage $V_{DD}$.

The capacitor C, in consequence, starts discharging through the coupling MOSFET T26 and the MOSFET T25. Then, the gate potential of the MOSFET T27 gradually approaches the ground potential and finally the MOSFET T27 is rendered again nonconductive. Accordingly, the MOSFET T28 is again rendered conductive and the MOSFET's T25 and T30 nonconductive. Thus, the MOSFET T27 has its source resistance increased to decrease its gain with the result that the drain potential of the MOSFET T27 more approaches the negative source voltage $V_{DD}$ and the drain potential $\overline{CL}$ of the MOSFET T28 the ground potential, whereby the MOSFET T25 is rendered nonconductive. As a result, the capacitor C is again charged through the MOSFET's T21 and T26. The clock pulse generator 40 may thus produce a clock pulse as shown in FIG. 6D at the output terminal $\overline{CL}$ thereof. FIG. 6E indicates a change of the drain potential of the MOSFET T30.

Reverting to FIG. 4, the outputs appearing at the $\overline{CL}$ and CL terminals of the clock pulse generator 40 are applied to two inputs of the flip flop or bistable circuit B3 and frequency divided. Further, the $\overline{CL}$ terminal of the generator 40 and one output terminal $\overline{Q}$ of the bistable circuit B3 are connected respectively to a NOR gate G16 as inputs thereof, and the CL terminal of the generator 40 and the other output terminal Q of the bistable circuit B3 are connected to a NOR gate G17 as inputs thereof. The CL terminal of the generator 40 and the terminal Q of the bistable circuit B3 are connected to an OR gate G18 as inputs thereof. The gate terminal CC of the MOSFET T27 in the generator 40 is connected to another input of the OR gate G18 via an inverter I24. The output of the OR gate G18 is connected to one input of a NAND gate G19 whose another input is connected via an inverter I25 to the output I of the inverter I13 to be hereinafter described. The output of the NAND gate G19 is connected to the reset terminal RR of each of the bistable circuits B1 to B3. Further, the output of the NOR gate G16 is connected in common to the other input of each of the NAND gates G14 and G15. The output $\overline{FWP}$ of the NAND gate G14 is connected the gate of the gate MOSFET T12 (see FIG. 2) as well as in common to the FWP terminal of each channel via an inverter I26. The output $\overline{REVP}$ of the NAND gate G15 is connected to the gate of the gate MOSFET T11 (see FIG. 2) as well as in common to the REVP terminal of each channel via an inverter I27. The output CP of the NOR gate G17 is connected in common to the CP terminal of each channel.

Figure 7:
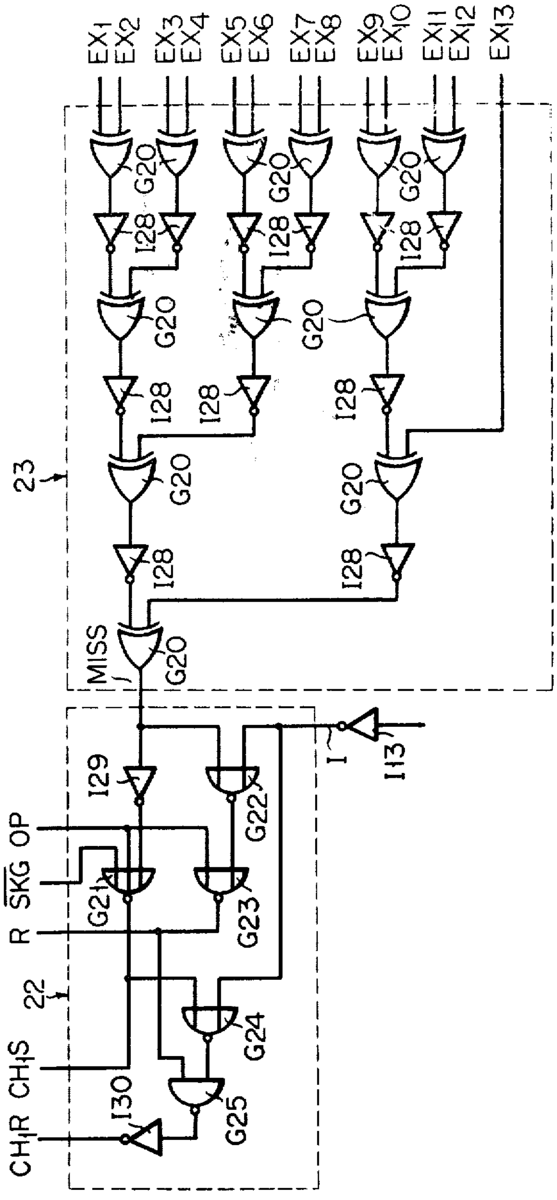
FIG. 7 is a practical circuit diagram of a set/reset controller and a parity generator shown in FIG. 2.

FIG. 7 shows a practical circuit arrangement of the set/reset controller 22 and the parity generator 23. The arrangement of the parity generator 23 is such that each two adjacent channels, namely CH1–CH2, CH3–CH4 . . . , are grouped in sequence so that their respectively grouped terminals EX1 to EX13 are connected to respective two-input exclusive OR gates G20, whose outputs are connected to respective inverters I28, the outputs of two adjacent ones of which are further connected to respective exclusive OR gates G20, whereby, by repeating this step, a desired output signal is obtained from the output MISS of finally one exclusive OR gate G20. The set/reset controller 22 includes a NOR gate G21 having an input connected via an inverter I29 to the output MISS of the parity generator 23 and further inputs connected to the output $\overline{SKG}$ of the inverter I11 and to the OP terminal of the shift pulse generator 21. The output of the NOR gate G21 is connected to the set terminal $CH_1S$ associated with the slave flip flop circuit 11 of the first channel CH1. The controller 22 further comprises NOR gate G22 having inputs connected to the output MISS of the parity generator 23 and the output I of the inverter I13, the output of said NOR gate G22 being connected to an input of a NOR gate G23. The NOR gate G23 has another input connected to the OP terminal of the shift pulse generator 21. The output of the NOR gate G23 is connected to the common-connected reset terminal R which is associated with the slave flip flop circuits 12 of the second to 13th channels. The output I of the inverter I13 is connected to a NOR gate G24 together with the output $CH_1S$ of the NOR gate G21. The output of the NOR gate G24 is connected, together with the output R of the NOR gate G23 to a NAND gate G25 whose output is connected via an inverter I30 to the reset terminal $CH_1R$ associated with the slave flip flop circuit 12 of the first channel.

Figure 8:
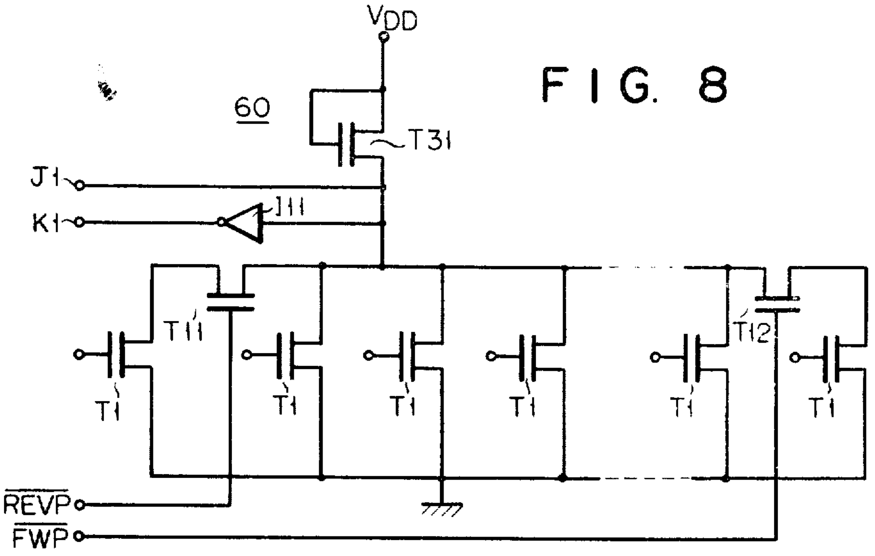
FIG. 8 is more detailed illustration of a skip circuit included in FIG. 2.

Referring to FIG. 8 which is a more detailed illustration of the skip circuit portion provided in each of the channels as shown in FIG. 1, the MOSFET's T1 included in the channels $CH_1$ to CH13 are collectively formed of a NOR gate 60 together with a load MOSFET 31. The source or output terminal of the load MOSFET T31 is connected to the skip terminal SKG common to the second to 12th channels, the terminal SKG being connected directly to the J1 terminal associated with the master flip flop circuit 11 of the first channel and also connected via the inverter I11 to the K1 terminal of the same flip flop circuit 11.

The operation of the channel selection device of the arrangement described in accordance with this invention will be described.

1. Power Supply

A channel selection device of this nature ordinarily tends to cause simultaneous selection of two or more channels due to a transient phenomenon at the time of power supply. This embodiment, as shown in FIGS. 2 and 3, provides a differentiation circuit 24 formed of the capacitor C1 connected between the negative source terminal $V_{DD}$ and the INIT terminal, and the MOSFET T13 having the drain-source path connected between said INIT terminal and the ground and which is rendered conductive only at the time of power supply, but rendered nonconductive instantaneously thereafter. Thus, at the time of power supply, the INIT terminal voltage is caused to transiently come close to the ground potential by the differentiation circuit 24 as shown in a dotted line in FIG. 9A.

Figures 9A, 9B:
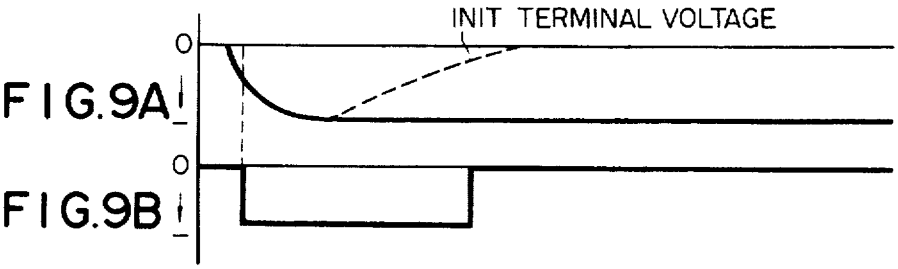
FIGS. 9A and 9B show the waveforms of circuit portions of an initial condition setting circuit used in the device of the invention.

The differentiation wave voltage appearing at the INIT terminal at the time of power supply is waveshaped through the series connected inverters I12 and I13 and derived as a binary signal 1 as shown by FIG. 9B (the output voltage of the series connected inverters in the other instance is always retained as binary 0). This binary signal 1 is impressed on the NOR gate G22 of FIG. 7, so that the output thereof becomes binary 0, the binary signal 0 being impressed on the NOR gate G23. Although the NOR gate G23 is impressed also with the output of the OP terminal, the output R of the NOR gate G23 becomes binary 1 by reason of the fact that the output of the OP terminal is likewise binary 0 at the time of power supply, thereby permitting each of the slave flip flop circuits 12 of the channels CH2 to CH13 other than the first channel to be reset. In this case, if the slave flip flop circuit 12 of the first channel CH1 is in the set state, such state, i.e., the positive channel selecting state, will be maintained. If the slave flip flop circuit 12 of the first channel is in the reset state, then the first channel CH1 is brought to the channel-selecting state in the following manner. When the slave flip flop circuit 12 of the first channel is in the reset state, the skip terminals SKG of all the channels including the first and 13th channels (the MOSFET's T11 and T12 being always rendered conductive except when the sequential channel selecting operation is executed) and the output MISS of the parity generator 23 are all binary 1 and the output of the OP terminal binary 0. Accordingly, signals that are impressed on the NOR gate G21 are all binary 0. For this reason, the output $CH_1S$ of the NOR gate G21 is rendered binary 1, thereby causing the slave flip flop 12 of the first channel to be forcedly in the set state, namely the state in which the first channel is operative for channel selection. Therefore, the first channel is always and only set in the channel selecting position at the time of power supply.

2. Individual Channel Selection

Individual selection of a channel is achieved by operating any one of the channel selection switches 32 provided for all the channels. When any switch 32 is put on, the output $O_3$ of the corresponding channel, say the third channel CH3, is impressed with a binary signal 0 owing to the differentiation signal from the differentiation circuit formed of the corresponding potentiometer 31 and the capacitor 34, whereby the slave flip flop 12 of the third channel is forcedly brought into the set position to permit the third channel to be selected. As in the case of power supply as discussed above, if the first channel CH1 is in the set position in addition to the third channel, apparent selection consists of simultaneous selection of two such channels. The non-selected first channel, however, is automatically reset immediately after selection of the now selected third channel in the manner described below.

Upon selection of the third channel the first channel is rendered to be in the selected position concurrently with the third channel, causing the output MISS of the parity generator 23 to become binary 1, which state is maintained till the generator 23 has the input condition that the number of the selected channels becomes one. The binary signal 1 of the generator 23 is converted into a binary 0 through the NOR gate G22 of FIG. 7 and is impressed on the NOR gate G23. Since the output of the OP terminal in this instance is also binary 0 (which changes to be binary 1 only at the time of such a forward or reverse shifting operation as will be described later), the output R of the NOR gate G23 becomes binary 1 to reset the slave flip flop circuits 12 of the second to 13th channels. The output of the inverter I13 (see FIG. 2) is, except at the time of power supply, binary 0 as mentioned above, and the skip terminals SKG of all the channels are binary 1, as is apparent from FIG. 8, when the slave flip flop circuit 12 of the first channel CH1 is in the set position, so that the output of the NOR gate G21 is binary 0. Because of this, the output of the NOR gate G24 becomes binary 1. On the other hand, the output MISS of the parity generator 23 in this instance is binary 1 so that the output of the NOR gate G22 is binary 0; and the output of the OP terminal is binary 0 as set out above, so that the output R of the NOR gate G23 is binary 1. Accordingly, the output of the NAND gate G25 becomes binary 0 and that $CH_1R$ of the inverter I30 binary 1, with the result that the slave flip flop 12 of the first channel is also reset. This renders apparently all the channels CH1 to CH13 to be brought into the non-selected position. However, when a reset pulse impression period for all the channels lapses, only the slave flip flop 12 of the selected third channel is maintained in the set position without being reset, thereby to select only the third channel, the reason being that a trigger capacitor 34 of great capacitance as indicated is connected as a load and through the pushing operation of the button switch 32 to the output $O_3$ of the slave flip flop circuit 12 of the third channel during said reset period. The period (about 25$\mu$s in the illustrated example) during which the charged voltage of the capacitor 34 is discharged through the associated parallel connected resistor 35 is sufficiently longer than the time (normally about 1$\mu$s) required for resetting the slave flip flop circuits 12 of all the channels. As will be understood from the foregoing, when the number of the selected channels becomes one, the output MISS of the parity generator 23 become binary 0 and there is no impression of the reset pulse as mentioned above.

3. Forward Shifting Operation

The forward shifting operation of channels is effected by successively impressing a forward shifting command pulse of binary 1 on the FWCOM terminal from a remote controller. First, a first forward shifting command pulse is impressed on the FWCOM terminal to make the output of the NAND gate G11 binary 0, whereby the bistable circuit B1 is rendered in the set position thereby allowing a binary signal 1 to be generated from the one output Q. Said binary signal 1 is impressed on the NOR gate G13 to generate a binary signal 0 at the output $\overline{OP}$ thereof, thereby forcedly nullifying the input from the NAND gate G11 (G12) till the bistable circuit B1 (B2) is again reset in the manner described below. The binary signal 0 from the NOR gate G13 is impressed on the inverter I23 to generate a binary 1 at the output OP thereof, thereby energizing the clock pulse generator 40 to be in an operative state. From the outputs $\overline{CL}$ and CL of the generator 40 are respectively obtained the oscillation outputs as described above, which are frequency divided by the bistable circuit B3. As a result, the NOR gate G16 generates a binary signal 1 at its output when the output $\overline{CL}$ of the clock generator 40 and the output Q of the bistable circuit B3 are both binary 0. In this case the bistable circuit B1 is in the set position so that a binary signal 0 can be obtained at the output $\overline{FWP}$ of the NAND gate G14. This binary signal 1 is impressed on the inverter I26 to supply a binany signal 1 to the output FWP thereof. The binary signal 1 is fed to the FWP terminal common to all the channels CH1 to CH13 thereby to shift to the master flip flop circuit 11 of each channel the binary signal stored in the slave flip flop 12 of the preceding channel, with the result that a half bit shift is obtained. in the initial state of operation, such as at the time of power supply, however, the slave flip flop circuit of the first channel is only set and the remainders are simply kept in the reset position.

When the output $\overline{CL}$ of the clock generator 40 and the output $\overline{Q}$ of the bistable circuit B3 are both binary 0, a binary signal 1 is supplied to the output CP of the NOR gate G17, and impressed, as the clock or shift pulse, on the CP terminal common to all channels to shift the binary signal stored in the master flip flop 11 of each channel to the corresponding one of the slave flip flop circuits 12, thus completing one bit shifting.

Figures 10A, 10B, 10C, 10D, 10E, 10F, 10G:
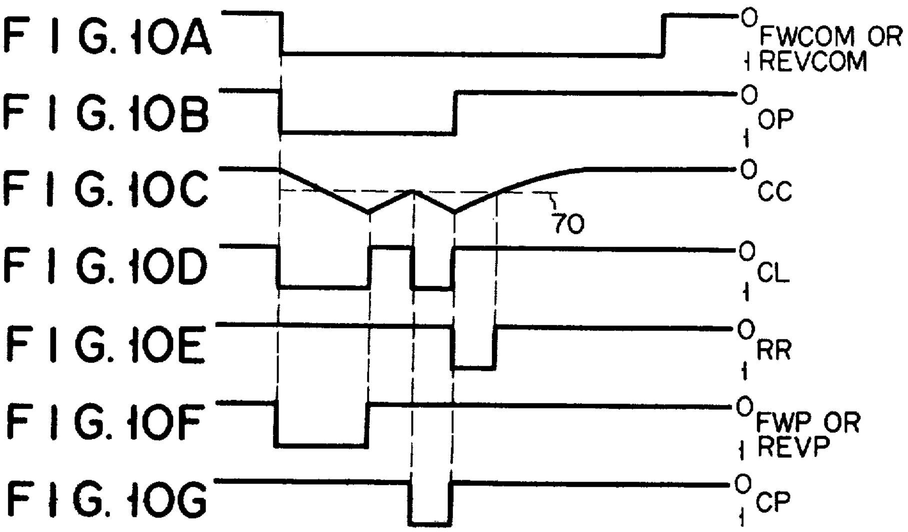
FIGS. 10A to 10G are timing charts representing the waveforms of circuit portions of the shift pulse generator shown in FIG. 4.

FIGS. 10A to 10G are timing charts representing conclete operating waveforms of circuit portions included in the shift pulse generator 21. More particularly, FIG. 10A represents the waveform of the forward (or reverse) shifting command pulse to be impressed on the FWCOM (or REVCOM) terminal, FIG. 10B that of the trigger pulse to be impressed on the OP terminal of the clock generator 40, FIG. 10C that of the charge and discharge voltage of the capacitor C similar to FIG. 6A, FIG. 10D that of the output pulse to be supplied to the CL terminal of the clock generator 40, FIG. 10F that of the forward (or reverse) shifting pulse to be fed to the FWP (or REVP) terminals of all the channels, and FIG. 10G shows the waveform of the clock or shift pulse to be impressed on the CP terminals of all the channels, respectively. In this case, the inverter I24 connected to the nongrounded end of the capacitor C has an inverted level as shown by a dotted line 70 in FIG. 10C and the output of the inverter I24 is always maintained at binary 0 during the oscillation period of the clock pulse generator 40. Thus, a binary 0 is obtained at the output of the OR gate G18 only when the output of the inverter I24, the CL terminal output of the clock generator 40 and the output Q of the bistable circuit B3 are all binary 0. In this case, since the output of the inverter I13 (see FIG. 2) is always binary 0 except at the time of power supply, the output of the inverter I25 is fed with a binary 1. Accordingly, at the output RR (see FIG. 10E) of the NAND gate G19 is generated a binary signal 1 when a second binary 0 signal through the CL terminal of the clock generator 40 is obtained and the Q terminal of the bistable circuit B3 generates a binary signal 1. The binary signal 1 acts to cause the bistable circuits B1 to B3 to be simultaneously reset, whereby the original position in which the forward shifting command pulse is capable of being supplied to the FWCOM terminal is attained. Similarly, with a sequential supply to the FWCOM terminal of the forward shifting command pulse, the sequential forward shifting operation by the cascade arranged shift register units $\mathbf{10}_1$ to $\mathbf{10}_{13}$ can be applied to the channels CH1 to CH13. The shift from the last channel CH13 to the first channel CH1 is effected as follows. Considering the skip terminal SKG of FIGS. 2 and 8, a binary 0 is supplied to th $\overline{\text{FWP}}$ terminal when a binary 1 is fed to the FWP terminal, so that the MOSFET T12 connected between the skip terminals SKG of the 12th channel CH12 and the last channel CH13 is rendered nonconductive with the result that the skip terminal of the 13th CH13 is electrically isolated from the skip terminal SKG common to the second to 12th channels. Said common skip terminal is maintained at binary 1 owing to the fact that the slave flip flop circuits 11 of each of the channels CH2 to CH12 are in the reset position. Since said skip terminal common to the second to 12th channels is connected directly to the J1 terminal of the first channel master flip flop circuit 11 and also to the K1 terminal thereof via the inverter I11, information stored in the slave flip flop circuit 12 of the 13th channel CH13 is shifted to the first channel CH1 when the forward shifting command signal is impressed on the FWP terminal. Any subsequent operation can be made in the manner mentioned above and the selection of the channels ranging from CH1 to CH13 can be sequentially and endlessly achieved in every one bit shift period.

4. Reverse shifting operation

In reverse shifting, the NAND gate G12, bistable circuit B2, NAND gate G15, inverter I27 and the MOSFET T11 are used respectively in place of the NAND gate G11, bistable circuit B1, NAND gate G14, inverter I26 and the MOSFET T12 all used in the forward shifting operation. Since the remainder of the channel selecting operation is identical with that in the case of forward shifting, a detailed description thereof is omitted.

5. Sequential selection of the first channel and any succeeding number of channels The slave flip flop circuit 11 of the channel, say the fourth channel CH4, immediately following that which takes the last position among the channels required for selection may be kept in the reset position by a suitable means, such as by short circuiting that of the potentiometers in FIG. 3 which is associated with such succeeding channel. Under such conditions, the forward shifting command pulse is, as described above, sequentially supplied to the terminal FMCOM to cause the slave flip flop circuit of the final channel CH3 to be in the reset position. A supply of the next forward shifting command signal under this situation causes the memory information stored in the third channel slave flip flop circuit 12 to be shifted to the fourth channel master flip flop circuit 11. The information contained in the fourth channel master flip flop circuit, when it is subsequently supplied with the clock or shift pulse, tends to be shifted to the slave flip flop circuit thereof. However, such shift is nullified since the fourth channel slave flip flop circuit is maintained to be in the reset position by external operation. At this point of time, the slave flip flop circuit of all the channels including the preselected first to third channels are in the reset position.

This causes the output MISS of the parity generator 23 to be binary 1. As a result, the first channel slave flip flop circuit is brought into the set position through the NOR gate G21, as has been described above, at the time when the binary signal 1 disappears from the OP terminal. By similarly repeating the above steps, sequential selection of channel can be achieved in such an order as CH1 → CH2 → CH3 → CH1.

It should be appreciated that the invention is not limited to the particular arrangements described above, but covers any modifications of substantially a common technical concept. For example, so far as individual channel selection is concerned, the shift pulse generator is unnecessary. Likewise the parity generator and the set/reset controller are unnecessary for sequential selection. Further, as will be apparent from FIG. 2, the circuitry 20 including the shift register units may be incorporated in the form of an integrated circuit in a dual-in-package of 20 pins.

What is claimed is:

1. A channel selection device for a multi-channel receiver comprising:

a shift register means including a plurality of cascade connected shift register stages for sequentially shifting a binary coded signal from one of said stages to another under control of a shift pulse, each of said stages having two outputs and the number of stages being the same as the number of channels of said multi-channel receiver which are adapted to be selected;

channel selection switches, each coupled with a respective one of said two outputs of each of said shift register stages for bringing a selected shift register stage to a channel selecting position;

a tuner including a variable capacitance diode coupled through respective potentiometers with said respective ones of said two outputs of each of said shift register stages for tuning a selected channel; and a simultaneous channel selection protecting means coupled to said shift register stages for causing only a single stage of said shift register stages to be brought to the channel selecting position whenever at least two of all the channels of the channel selection device are simultaneously selected by an erroneous operation.

2. A channel selection device according to claim 1, comprising an initial condition determining means coupled to said shift register means for forcedly setting a predetermined one of said shift register stages in the channel selecting position only during an initial state including at the time of initiation of power supply.

3. A channel selection device according to claim 2, wherein said initial condition determining means comprises:

a differentiation circuit for differentiating a dc power supply voltage at the time of the initation of power supply;

a wave shaper for wave-shaping the output from said differentiation circuit and generating an output wave-shaped signal; and means for applying said wave-shaped signal to said shift register means so as to bring said predetermined one of said shift register stages to the channel selecting position.

4. A channel selection device according to claim 3 wherein said wave-shaped signal is applied to the shift register stages other than said predetermined one to inhibit said other stages from being brought into said channel selecting position during said initiation of power supply.

5. A channel selection device according to claim 1, wherein said simultaneous channel selection protecting means comprises:

a parity generator including a plurality of exclusive OR gates and inverters, having a plurality of inputs connected to a respective one of two outputs of each of said shift register stages and generating an erroneous operation signal whenever two of all the channels of the channel selection device are simultaneously selected; and a set/reset controller coupled to said parity generator and to said shift register stages so as to bring only a single shift register stage selected from said shift register stages to the set or channel selecting position and the other shift register stages to the reset or nonselecting position whenever the erroneous operation signal from said parity is received.

6. A channel selection device according to claim 1, wherein the two outputs of each stage of said cascade connected shift register stages are connected to two inputs of the succeeding stage as well as to two inputs of the preceding stage, to thereby selectively enable a sequential forward shift operation as well as a sequential reverse shift operation under control of external forward and reverse shift signals, and each shift register stage has a skip terminal defined by an output terminal of a NOR gate with its input terminal connected through an inverter to one for channel selection of the two outputs of the associated shift register stage, the skip terminals excepting for the first register stage and the last shift register stage being connected in common to a dc power supply terminal via a load resistance element, directly to one of the two inputs of each of the first and last shift register stages and also to the other input of each of the first and last shift register stages through an inverter, the skip terminal of the first shift register stage being connected to that of the second shift register stage through the main current conduction path of a switching element having a control electrode applied with a signal having a phase inverted from the external forward shift signal, and the skip terminal of the last shift register stage being connected to that of the immediately preceding shift register stage through the main current conduction path of another switching element having a control electrode applied with a signal having a phase inverted from the external reverse shift signal.

7. A channel selection device according to claim 1 further comprising a signal shifting means coupled to said shift register, said shifting means including a clock pulse generator and producing an output signal for sequentially shifting said shift register stages from one to another upon reception of an external input channel selection signal.

8. A channel selection device according to claim 7, wherein said clock pulse generator included in said signal shifting means comprises:

a capacitor connected through a resistance element to a dc voltage source; and a hysteresis circuit connected across the plates of said capacitor and responsive to external forward and reverse shift signals for controlling a periodic charge and discharge operation of said capacitor during the application of said external forward and reverse shift signals to the hysteresis circuit.

* * * * *